W. G. CRAIG.
FUEL SUPPLY VALVE FOR AUTOMOBILES.
APPLICATION FILED JUNE 5, 1917.
1,264,019.
Patented Apr. 23, 1918.
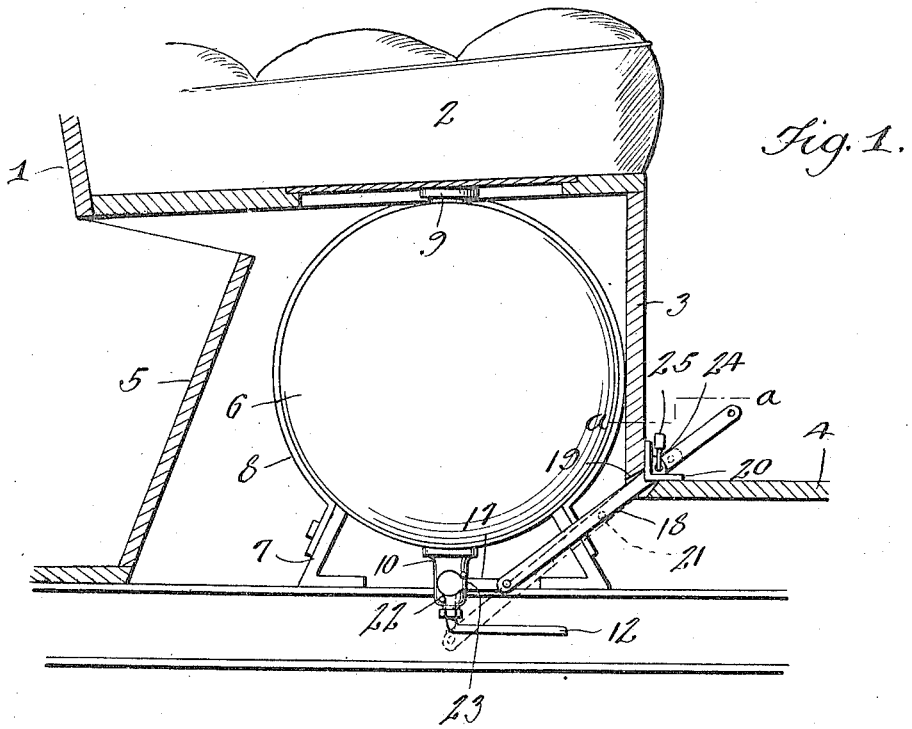
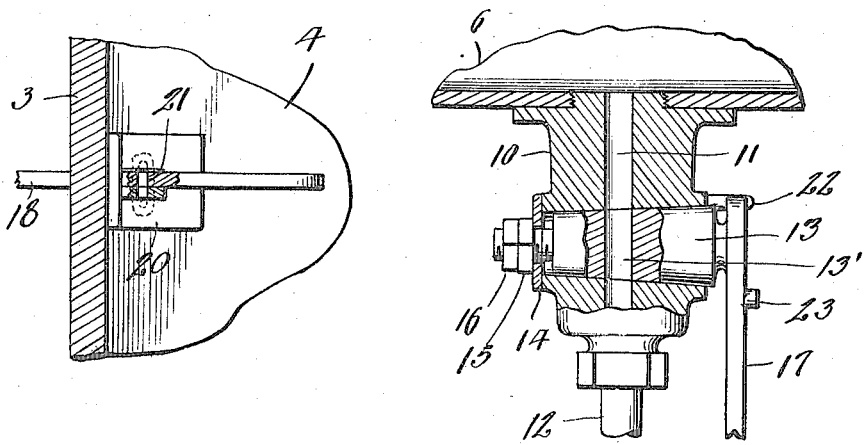
WITNESS
INVENTOR
W. G. Craig,
BY Victor J. Evans
ATTORNEY

UNITED STATES PATENT OFFICE.

WILLIAM G. CRAIG, OF MARSHALLTOWN, IOWA.

FUEL-SUPPLY VALVE FOR AUTOMOBILES.

1,264,019.  Specification of Letters Patent.  Patented Apr. 23, 1918.

Application filed June 5, 1917. Serial No. 173,010.

*To all whom it may concern:*

Be it known that I, WILLIAM G. CRAIG, a citizen of the United States, residing at Marshalltown, in the county of Marshall and State of Iowa, have invented new and useful Improvements in Fuel-Supply Valves for Automobiles, of which the following is a specification.

My invention relates to fuel supply valves for automobiles and has for its primary object to provide a fuel supply valve of a simple construction which may be locked in its closed position to prevent unauthorized use of the car.

A further object of my invention is to provide a fuel supply valve, which is adapted to be locked in closed position, and which may be easily applied to an automobile of usual construction.

With these and other objects in view which will be hereinafter fully described and particularly pointed out in the claim, the invention consists in the novel construction and arrangement of parts illustrated in the accompanying drawings forming a part of this specification, in which:—

Figure 1 is a vertical section through a portion of an automobile showing a fuel supply valve embodying my invention attached thereto.

Fig. 2 is a fragmentary plan view of Fig. 1 showing the handle and the manner of locking the same.

Fig. 3 is a transverse section through the fitting valve mounted therein.

Like characters of reference indicate like parts in the various views.

In the drawings 1 designates generally the body of an automobile, which has a seat 2 formed therein, said seat being provided with a vertical heel-board 3 at the forward end thereof as is the usual practice. The body is also provided with a floor 4 extending forward of the heel-board 3, and the body is closed at the rear of the seat as designated at 5. A tank 6 is mounted below the seat 2 upon saddles 7, and clamping bands 8 coöperate therewith to secure the tank upon the vehicle. A filler cap 9 is provided at the top of the tank and has an air vent therein to allow air to enter the tank as the fuel is drawn therefrom.

A fitting 10 is mounted on the bottom of the tank and has a passage 11 formed therein communicating with the interior of the tank. A pipe 12 has its rear end secured upon said fitting and the passage thereof communicates with the passage 11 of the fitting. Said pipe 12 leads from said fitting to the carbureter of the motor, not shown. A valve 13 is mounted for rotation in a transverse aperture of the fitting 10 which intersects the passage 11. The valve 13 is provided with a hole 13' which is adapted to register with the passage 11 allowing the fuel to flow in said passage when the valve is in a certain position. It will be noted that the valve 13 is tapered and that the transverse aperture in the fitting 10 is tapered correspondingly whereby any wear produced by the operation of the valve may be compensated for. A threaded stud is formed upon the small end of the valve 13, and a washer 14 is mounted thereon and abuts a surface of the fitting 10. A nut 15 is screw threaded upon said stud and holds said washer in engagement with the surface of the fitting. A lock-nut 16 is screw threaded upon said stud and serves to lock the nut 15 in any adjustment. Thus the valve 13 is restricted laterally in the fitting 10 by the tapered formation thereof and the engagement of the washer 14 with the surface of the fitting. An operating lever 17 is formed at the large end of the valve 13, and an operating handle 18 has its one end pivotally secured to said operating lever and extends through an aperture 19 in the heel-board 3. An eye member 20 is mounted upon the front surface of the heel-board 3 adjacent the aperture 19 and is adapted to register with a hole 21 formed in the extended portion of the operating handle 18 when the valve is closed. Stops 22 are formed upon the fitting 10 and coöperate with a projection 23 formed on the valve 13 to limit the movement of said valve, so that the operator may easily open or close the valve merely by pushing or pulling the operating handle 18, so that the projection 23 may engage the corresponding stop.

As above noted the eye member 20 is adapted to register with the hole 21 in the operating handle 18 when the valve is closed. When in this position the hasp 24 of an ordinary padlock 25 may be inserted in said eye member and said hole, and lock the valve in closed position.

Having thus fully described my invention, I claim:—

In a fuel supply for motor vehicles, the combination with a tank disposed beneath the seat of the vehicle, a supply pipe leading from said tank and a valve in said pipe, of a rod having one end connected with said valve and its opposite end projecting through an opening at the point of juncture of the footboard of the seat with the floor of the car, an L-shaped plate fitted in the angle formed by said board and floor, and having an opening registering with the opening aforementioned, said handle projecting through the opening of said plate, an apertured lug projecting from said plate, and disposed parallel to said handle, said handle having spaced openings adapted to alternately register with the aperture of said lug, to accommodate a locking element when the valve is in either its closed or opened position.

In testimony whereof I affix my signature.

WILLIAM G. CRAIG.

Copies of this patent may be obtained for five cents each, by addressing the "Commissioner of Patents, Washington, D. C."